United States Patent
Jeong et al.

(10) Patent No.: US 6,879,569 B2
(45) Date of Patent: Apr. 12, 2005

(54) SYSTEM FOR CONTROLLING INTERNATIONAL MOBILE TELECOMMUNICATIONS—2000 (IMT-2000) BASE STATION

(75) Inventors: Heon-Joo Jeong, Ichon-shi (KR); Su-Young Kwon, Ichon-shi (KR)

(73) Assignee: UTStarcom Korea Limited, Alameda, CA (US)

( * ) Notice: Subject to any disclaimer, the term of this patent is extended or adjusted under 35 U.S.C. 154(b) by 777 days.

(21) Appl. No.: 09/741,608

(22) Filed: Dec. 19, 2000

(65) Prior Publication Data

US 2002/0003800 A1 Jan. 10, 2002

(30) Foreign Application Priority Data

Feb. 22, 2000 (KR) ............................................ 2000-8517

(51) Int. Cl.[7] ............................ H04Q 7/00; H04L 12/56
(52) U.S. Cl. ................... 370/328; 370/395.6; 370/401; 370/466
(58) Field of Search .......................... 370/395.1, 395.6, 370/465, 466, 469, 401, 328

(56) References Cited

U.S. PATENT DOCUMENTS

| | | | | |
|---|---|---|---|---|
| 5,878,045 A | * | 3/1999 | Timbs ........................ | 370/466 |
| 5,949,785 A | | 9/1999 | Beasley ...................... | 370/398 |
| 6,018,521 A | | 1/2000 | Timbs et al. ................ | 370/342 |
| 6,034,950 A | * | 3/2000 | Sauer et al. ................ | 370/310.2 |
| 6,072,798 A | | 6/2000 | Beasley ...................... | 370/395 |
| 6,115,381 A | | 9/2000 | Benenti et al. .............. | 370/395 |
| 6,445,683 B1 | * | 9/2002 | Nobuyasu et al. .......... | 370/310.1 |
| 6,456,860 B1 | * | 9/2002 | Nakagaki .................... | 455/561 |
| 6,597,698 B1 | * | 7/2003 | Lundback et al. .......... | 370/398 |
| 2002/0072380 A1 | * | 6/2002 | Takashima et al. ......... | 455/461 |

FOREIGN PATENT DOCUMENTS

| | | |
|---|---|---|
| JP | 145963 | 5/1999 |
| JP | 083273 | 3/2000 |
| WO | 9933313 | 7/1999 |

OTHER PUBLICATIONS

"Third–Generation Mobile Telecommunication System"; *Matsushita Technical Journal*; vol. 44, No. 6 Dec. 1998 pp. 627–636.

* cited by examiner

*Primary Examiner*—Dang Ton
*Assistant Examiner*—Robert C Scheibel
(74) *Attorney, Agent, or Firm*—McDonnell Boehnen Hulbert & Berghoff LLP

(57) ABSTRACT

A system for controlling an international mobile telecommunications—2000 (IMT-2000) base station includes: a base transceiver station (BTS) for providing asynchronous transfer mode (ATM) cells; an asynchronous transfer mode (ATM) switch for performing a switching of the ATM cells; and a BTS interface subsystem (BIS) for interfacing the base transceiver station (BTS) with the asynchronous transfer mode (ATM) switch, wherein the BTS interface subsystem (BIS) includes a plurality of assembly symbol subsystems (ASSs) for receiving the ATM cells transmitted from the base transceiver station (BTS) and performing a type conversion of the ATM cells to output a type converted ATM cells to the asynchronous transfer mode (ATM) switch.

8 Claims, 5 Drawing Sheets

SYSTEM FOR CONTROLLING INTERNATIONAL MOBILE TELECOMMUNICATIONS— 2000 (IMT-2000) BASE STATION

FIELD OF THE INVENTION

The present invention relates to a telecommunication system; and, more particularly, to a base transceiver station (BTS) interface subsystem (BIS) for use in an international mobile telecommunication—2000 (IMT-2000) base station controller.

DESCRIPTION OF THE PRIOR ART

An international mobile telecommunications—2000 (IMT-2000) system transmits various kinds of traffic data by employing an asynchronous transfer mode (ATM) scheme.

FIG. 1 is a schematic diagram showing a typical IMT-2000 base station controller.

Referring to FIG. 1, the typical IMT-2000 base station controller includes an IMT-2000 base transceiver station (BTS) 10, a BTS interface subsystem (BIS) 20, an ATM switch 30, an ATM multiplexing subsystem (AMS) 40, a selection/distribution subsystem (SDS) 50 and a mobile services switching center (MSC) 60. The typical IMT-200 base station controller further includes a controller/signaling subsystem (CSS) 70 and a base station management subsystem (BEMS) 80.

The BIS 20 performs an interface with the BTS 10, and the ATM switch 30 switches the ATM cells that are transmitted from the BIS 20. The AMS 40 performs an interface between the ATM switch 30 and the MSC 60, and the SDS 50 performs an operation of transcoding sound traffic data of ATM cell type. The CSS 70 manages wireless resources, a call control and the like, and the BEMS 80 entirely manages operations related to the base station and the controller.

The BIS 20 includes four ATM frame/deframe assemblies (AFDAs) 21 to 24 and an ATM multiplexing/demultiplexing assembly (AMDA) 25. Each AFDA 21 to 24 divides the ATM cells transmitted from the BTS 10 into ATM adaptation layer 2(AAL2) ATM cells and AAL5 ATM cells. The AMDA 25 multiplexes the ATM cells transmitted from the AFDAs 21 to 24 to transmit multiplexed ATM cells to the ATM switch 30. Furthermore, the AMDA 25 demultiplexes the ATM cells transmitted from the ATM switch 30 to transmit demultiplexed ATM cells to the AFDA 21 to 24.

The AMS 40 includes a first selector multiplexer/demultiplexer (SMDA) 41, a second SMDA 42 and a plurality of selector/transcode interface assemblies (STIAs) 45 to 48.

The first SMDA 41 demultiplexes ATM cells transmitted from the ATM switch 30, and multiplexes ATM cells transmitted through a cell bus and then transmits multiplexed ATM cells to the ATM switch 30.

The second SMDA 42 multiplexes/demultiplexes ATM cells transmitted from the MSC 60.

The plurality of the STIAs 45 to 48 checks what kind of the ATM cells, which are transmitted from the first and the second SMDA 41 and 42, are. Then, the STIAs transmit AAL2 ATM cells of sound data to the SDS 50.

The SDS 50 includes a STIA 51 for interfacing with the AMS 40 and a selector/transcode board assembly (STBA) 52 for transcoding the sound data transmitted from the STIA 51.

FIG. 2 is a block diagram illustrating an AFDA shown in FIG. 1.

Referring to FIG. 2, each of four AFDAs 21 to 24 includes four E1 line interface units (LIUs) 200 to 203, four universal test and operations physical interface for ATM (UTOPIA) function execution units 204 to 207, four type conversion units 208 to 211, a 4:1 multiplexer 212 and a cell bus interface unit 213.

Each of the LIUs 200 to 203 performs an ATM physical layer function and interfaces with an E1 line coupled to the BTS 201.

Each of the UTOPIA function execution units 204 to 207, respectively coupled to the LIUs 200 and 203, interfaces with UTOPIA level 1.

Each of the type conversion units 208 to 211 performs a type conversion of ATM cells in order to allow the ATM cell to be ATM-switchable, and converts ATM-switched ATM cells into AAL2 ATM cells.

The 4:1 multiplexer 212 multiplexes the ATM cells transmitted from the type conversion units 208 to 211 to transmit multiplexed ATM cells to the cell bus interface unit 213. Furthermore, the 4:1 multiplexer 212 demultiplexes the ATM cells transmitted from the cell bus interface unit 213 to transmit demultiplexed ATM cells to the type conversion units 208 to 211.

The cell bus interface unit 213 transmits the ATM cells, which are transmitted from the 4:1 multiplexer 212, to the AMDA 25 through an interface with the cell bus, and it also receives the ATM cells transmitted from the AMDA 25.

FIG. 3 is a block diagram showing the AMDA 25 shown in FIG. 1.

Referring to FIG. 3, the AMDA 25 includes a processor 300, a 8 bit cell routing unit 301, a 8 bit multiplexer 302, a layer conversion unit 303 and two 8 bit user-network interface (UNI) units 304 and 305.

The processor, e.g., MPC860 supplied by Motorola, 300 performs an AAL5 process with respect to the ATM cells. The 8 bit cell routing unit 301 performs a routing of the ATM cells transmitted via the cell bus.

The 8 bit multiplexer 302 classifies the ATM cells transmitted from the 8 bit cell routing unit 301 into ATM cells to be transmitted to the processor 300 and ATM cells to be transmitted to the ATM switch 30. The layer conversion unit 303 performs an operation of an ATM layer conversion so that the processor 300 performs an AAL5 process with respect to the ATM cells transmitted from the 8 bit multiplexer 302.

The 8 bit UNIs 304 and 305 act as an interface between the 8 bit multiplexer 302 and the ATM switch 30 at a speed of 155 Mbps.

Hereinafter, an operation of the typical IMT-2000 base station controller will be described with reference to FIGS. 1 to 3.

Each LIU 200 to 203 contained in each AFDA 21 to 24 includes PM4313 chip, PM7344 chip, and a microprocessor such as MPC860. The PM4313 chip and PM7344 chip are provided by PMC-Sierra. The PM4313 chip for an electrical interface with the E1 line performs a line encoding/decoding function and processes four E1 lines. The PM7344 chip performs a multiplexing/demultiplexing function with respect to four E1 lines. The MPC860 stores the ATM cells outputted from the PM7344 and processes control signals.

The ATM cells transmitted from the BTS 10 via the E1 line are inputted through the PM4313 chip and the PM7344 chip to the MPC860, and then, transmitted to the UTOPIA function execution units 204 to 207. The UTOPIA function execution units 204 to 207 perform an interface to UTOPIA level 1 and transmit the ATM cells to the type conversion units 208 to 211. The type conversion units 208 to 211 performs a type conversion operation with respect to the ATM cells in order to allow the ATM cells to be switchable and then transmit the ATM cells to the 4:1 multiplexer 212. The ATM cells are transmitted to the AMDA 25 via the cell bus interface unit 213.

Then, the AMDA 25 multiplexes the ATM cells outputted from four AFDAs 21 to 24 to transmit multiplexed ATM cells to the ATM switch 30. The ATM switch 30 routes the ATM cells and routed ATM cells are transmitted to the AMS 40. The AMS 40 transmits ATM cells corresponding to sound data to the SDS 50 and remaining ATM cells to the MSC 70, respectively.

In such a typical BIS, however, the conversion of ATM cell types is carried out in four AFDA, and the interface between the AMDA and the ATM switch is performed so that main control function is distributed. Therefore, there are disadvantages that an unnecessary function such as the cell bus interface is repeated. Furthermore, since each LIU contained in the AFDA includes the type conversion unit, there is a problem that a chip size is increased.

SUMMARY OF THE INVENTION

It is, therefore, an object of the present invention to provide a BTS interface subsystem (BIS) for use in an international mobile telecommunication—2000 (IMT-2000) base station controller.

In accordance with an aspect of the present invention, there is provided a system for controlling an international mobile telecommunications—2000 (IMT-2000) base station, comprising: a base transceiver station (BTS) for providing asynchronous transfer mode (ATM) cells; an asynchronous transfer mode (ATM) switch for performing a switching of the ATM cells; and a BTS interface subsystem (BIS) for interfacing the base transceiver station (BTS) with the asynchronous transfer mode (ATM) switch, wherein the BTS interface subsystem (BIS) includes a plurality of assembly symbol subsystems (ASSs) for receiving the ATM cells transmitted from the base transceiver station (BTS) and performing a type conversion of the ATM cells to output a type converted ATM cells to the asynchronous transfer mode (ATM) switch.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Figure 1:
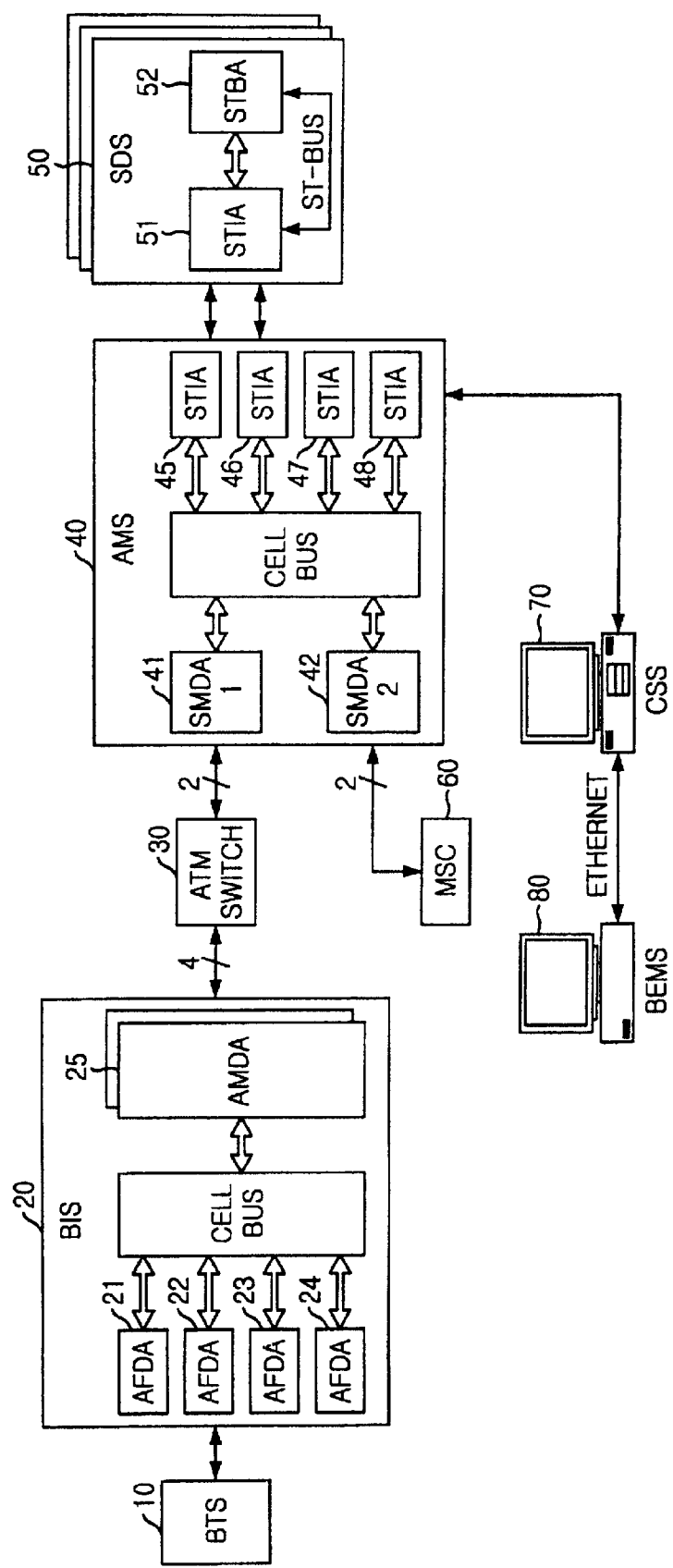
FIG. 1 is a schematic diagram showing a typical IMT-2000 base station controller.
Figure 2:
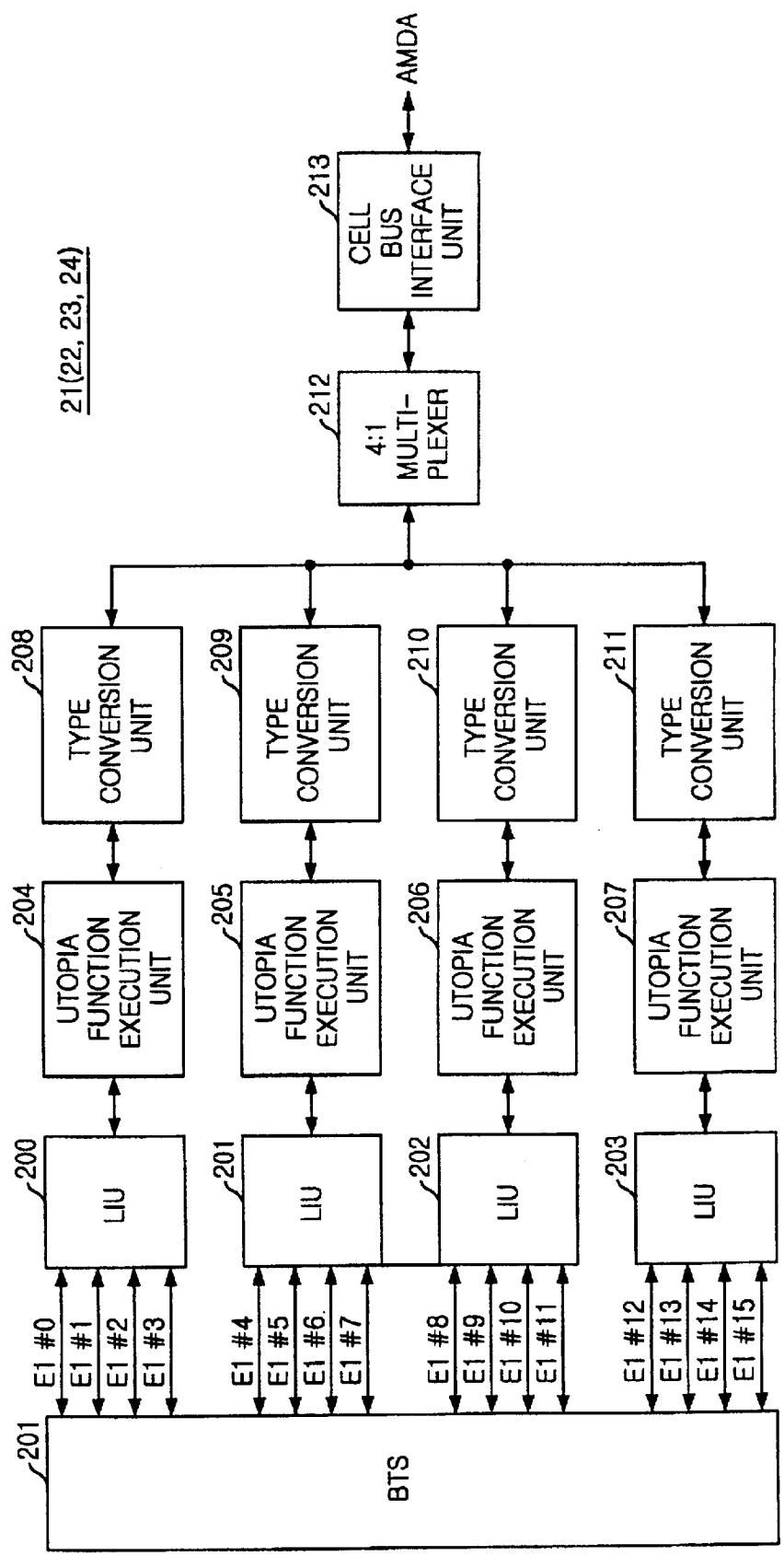
FIG. 2 is a block diagram illustrating an AFDA shown in FIG. 1.
Figure 3:
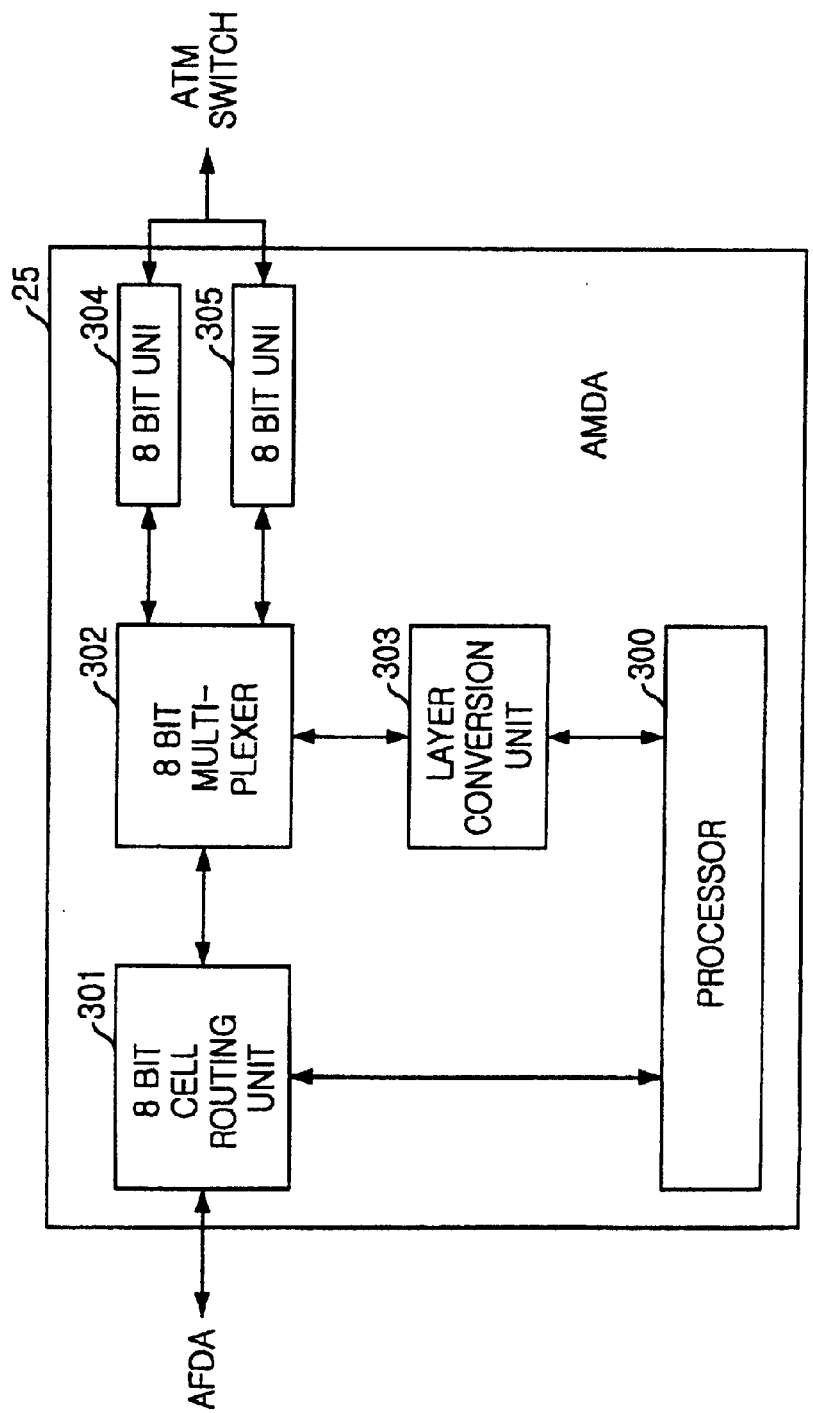
FIG. 3 is a block diagram showing an AMDA shown in FIG. 1.
Figure 4:
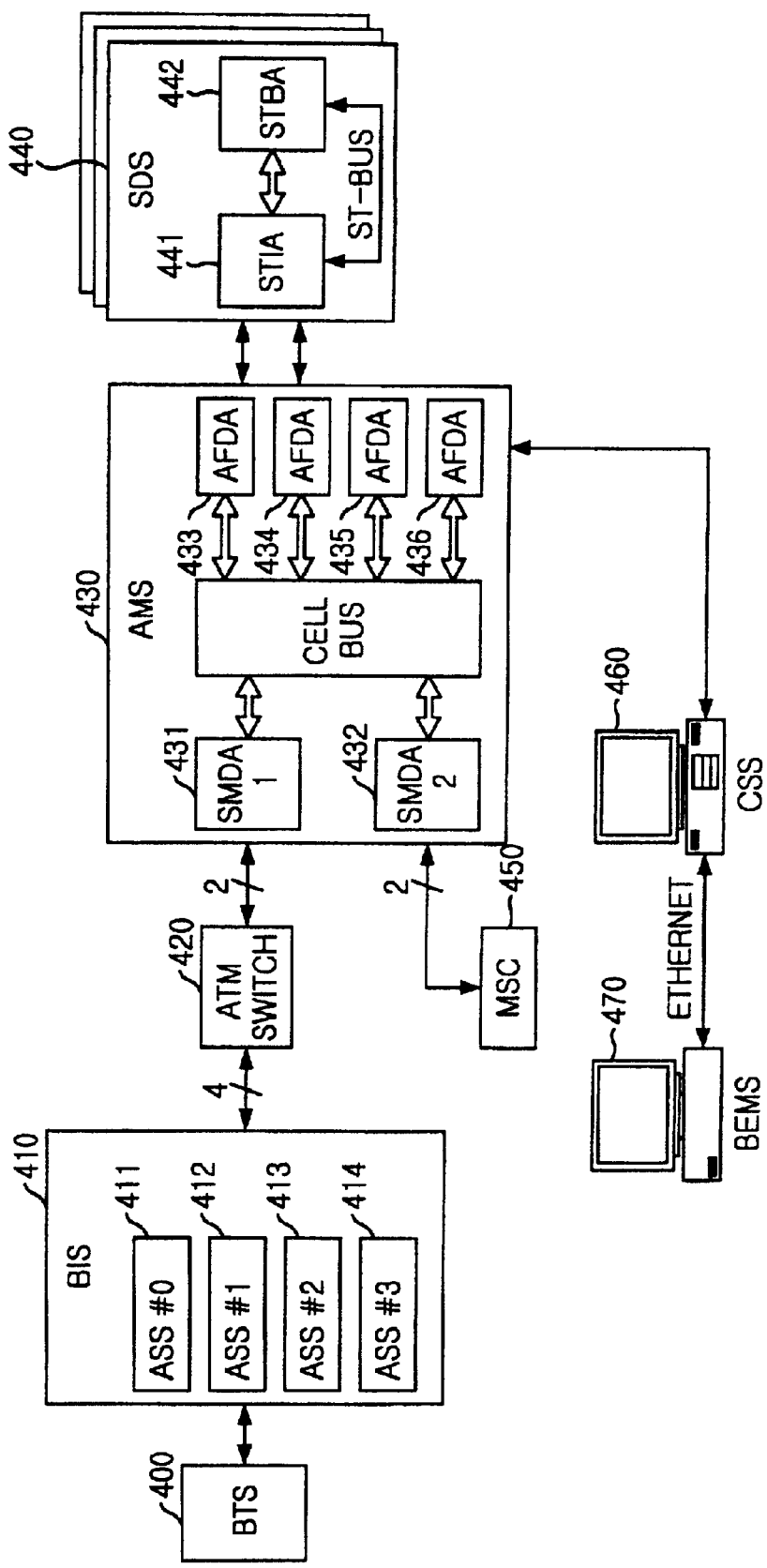
FIG. 4 is a block diagram illustrating an IMT-2000 base station controller in accordance with the present invention.

FIG. 4 is a block diagram illustrating an IMT-2000 base station controller containing a BIS in accordance with the present invention.

Referring to FIG. 4, the BIS 410 in accordance to the present invention includes assembly symbol subsystems (ASSs) 411 to 414. Each of the ASSs 411 to 414 performs a type conversion of ATM cells transmitted from a BTS 400 via E1 line in order to allow the ATM cells to be ATM-switchable, and interfaces with an ATM switch 420. At this time, the number of the ASSs is determined by that of the E1 lines.

Figure 5:
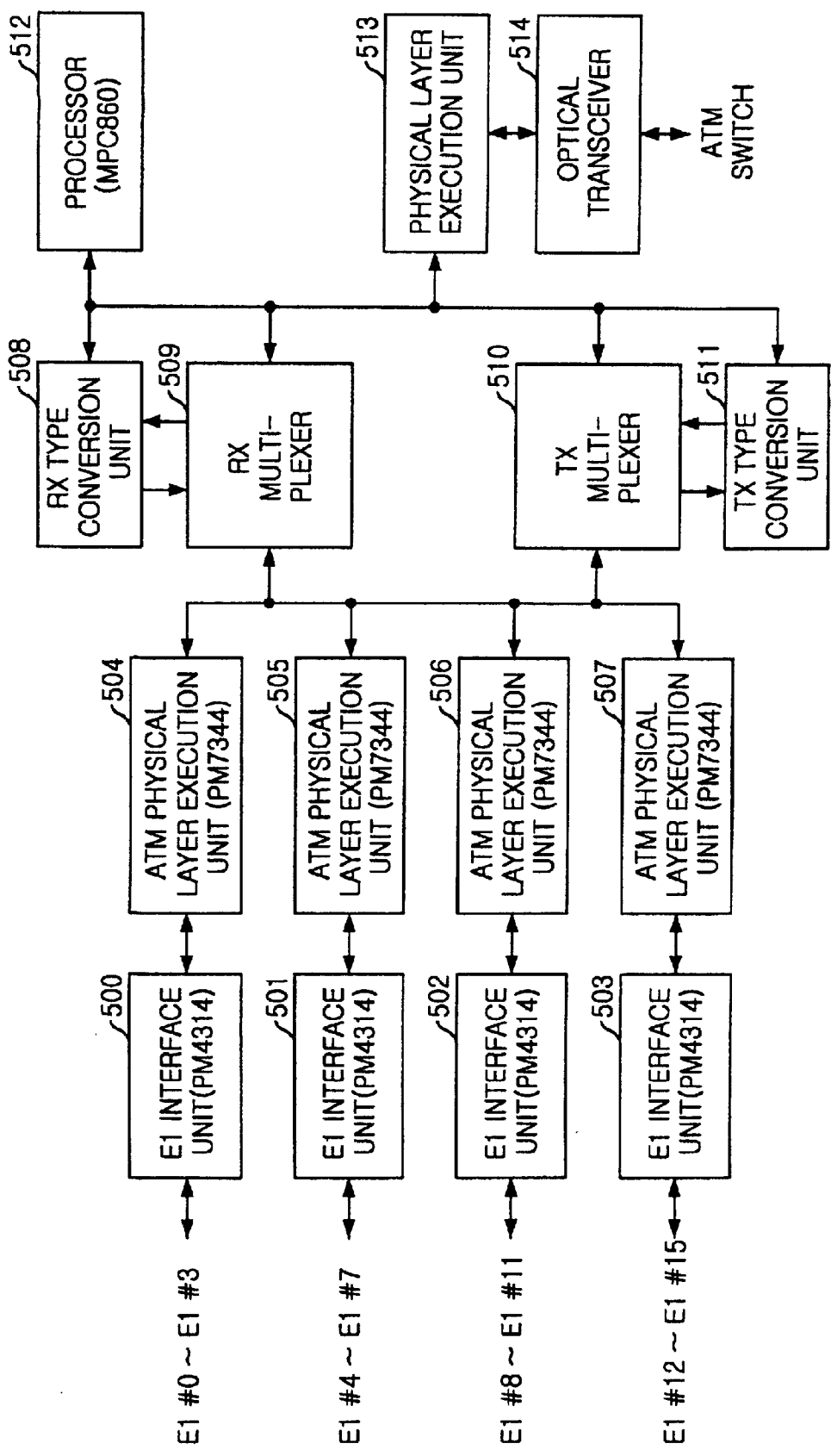
FIG. 5 is a block diagram illustrating an ASS shown in FIG. 4.

FIG. 5 is a block diagram illustrating the ASS shown in FIG. 4.

Referring to FIG. 5, each of the ASSs 411 to 414 includes a processor 512 for controlling an operation of the BIS 410, a plurality of E1 interface units 500 to 503, a plurality of ATM physical layer execution units 504 to 507, a reception (RX) type conversion unit 508, a reception (RX) multiplexer 509, a transmission (TX) multiplexer 510, a transmission (TX) type conversion unit 511, a physical layer execution unit 513, and an optical transceiver 514.

The E1 interface units 500 to 503 restore and encode data transmitted via E1 lines and output E1 frame data.

The ATM physical layer execution units 504 to 507 extract ATM cells from the E1 frame data and perform an error correction operation to the ATM cell header and a cell rate decoupling operation. Furthermore, the ATM physical layer execution units 504 to 507 transmit data to the BTS 400.

The RX multiplexer 509 transmits ATM cells corresponding to internal signals to the processor 512 and the remaining ATM cells to the RX type conversion unit 508.

The RX type conversion unit 508 classifies the ATM cells transmitted from the RX multiplexer 509 into AAL5 ATM cells and AAL2 ATM cells. At this time, the RX type conversion unit 508 bypasses the AAL5 ATM cells to the RX multiplexer 509, and converts the AAL2 ATM cells into AAL2 prime ATM cells to transmit the AAL2 prime ATM cells to the RX multiplexer 509.

The TX multiplexer 510 transmits ATM cells corresponding to the internal signals to the processor 512 and transmits the remaining ATM cells to the TX type conversion unit 511.

The TX type conversion unit 511 classifies the ATM cells transmitted from the TX multiplexer 510 into AAL5 ATM cells and AAL2 ATM cells. At this time, the TX type conversion unit 511 bypasses the AAL5 ATM cells to the TX multiplexer 510, and converts the AAL2 ATM cells into AAL2 prime ATM cells and transmits the AAL2 prime ATM cells to the RX multiplexer 509.

The physical layer execution unit 513 performs a physical layer function to the ATM cells at a speed of 155 Mbps, wherein the ATM cells are transmitted between the RX multiplexer 509 and the optical transceiver 514.

The optical transceiver 514 receives data from the physical layer execution unit 513 and transmits it to the ATM switch 420. Also, the optical transceiver 514 receives data from the ATM switch 420 and transmits it to the physical layer execution unit 513.

At this time, the number of the E1 interface units is determined by a total number of the E1 lines that are controlled by the ASS. Each E1 interface unit can controls four E1 lines.

Each of the E1 interface units 500 to 503 includes PM4313 chip, and each of the ATM physical layer execution units 504 to 507 includes PM7344 chip. Furthermore, the physical layer execution unit 513 includes PM5346 chip.

Hereinafter, an operation of the BIS 410 contained in the IMT-2000 base station controller will be described in detail.

First, an interface function of the BIS 410 will be described in case where the ATM cells are transmitted from the BTS 400 to the ATM switch 420.

When the E1 interface units 500 to 503 receives the ATM cells from the BTS 400 via four E1 lines, the E1 interface units 500 to 503 performs data restoration/encoding functions and transmit E1 frame data to the ATM physical layer execution units 504 to 507. Then, the ATM physical layer execution units 504 to 507 extract ATM cells from the E1 frame data and perform an error correction operation to the ATM cell header and a cell rate decoupling operation.

The RX multiplexer 509 receives extracted ATM cells and classifies the extracted ATM cells. At this time, the RX multiplexer 509 transmits ATM cells corresponding to internal signals to the processor 512, and transmits the remaining ATM cells to the RX type conversion unit 508, respectively.

The RX type conversion unit 508 classifies the received ATM cells into AAL2 ATM cells and AAL5 ATM cells. At this time, while the AAL5 ATM cells are bypassed to the RX multiplexer 509, the AAL2 ATM cells are converted into AAL2 prime ATM cells which are ATM-switchable. Here, the AAL2 prime ATM cells are made by extracting multi-user sound data on the AAL2 ATM cells according to the users. That is, the AAL2 prime ATM cells can be ATM-switchable. The AAL2 prime ATM cells are again transmitted to the RX multiplexer 509.

The RX multiplexer 509 transmits the received ATM cells to the physical layer execution unit 514 at a speed of 155 Mbps, and the physical layer execution unit 513 transmits the ATM cells to the ATM switch 420 via the optical transceiver 514.

Second, an interface function of the BIS 400 will be described in case where the ATM cells are transmitted from the ATM switch 420 to the BTS 400.

ATM cells are transmitted from the ATM switch 420 to the physical layer execution unit 513 via the optical transceiver 514, and the physical layer execution unit 513 then transmits the ATM cells to the TX multiplexer 510. At this time, ATM cells of the internal control signals are transmitted to the processor 512 and the remaining ATM cells are transmitted to the TX type conversion unit 511.

Then, in the TX type conversion unit 511, the AAL5 ATM cells among the ATM cells are bypassed to the TX multiplexer 510. The ALL2 prime ATM cells are converted into the AAL2 ATM cells, and the AAL2 ATM cells are then transmitted to the TX multiplexer 510. The TX multiplexer 510 demultiplexes the ATM cells, transmitted from the TX type conversion unit 511, to the ATM physical layer execution units 504 to 507. The ATM cells are then transmitted to the BTS 400 via corresponding ATM physical layer execution unit and corresponding E1 interface unit.

As described above, by implementing a plurality of ASS units for performing the ATM cell type conversion function and the ATM switch interface function, the main control function of the BIS is integrated so that an unnecessarily repeated function is effectively prevented.

While the present invention has been described with respect to certain preferred embodiments only, other modifications and variation may be made without departing from the spirit and scope of the present invention as set forth in the following claims.

What is claimed is:

1. A system for controlling an international mobile telecommunications—2000 (IMT-2000) base station, comprising:
    a base transceiver station (BTS) for providing asynchronous transfer mode (ATM) cells;
    an asynchronous transfer mode (ATM) switch for performing a switching of the ATM cells; and
    a BTS interface subsystem (BIS) for interfacing the base transceiver station (BTS) with the asynchronous transfer mode (ATM) switch, wherein the BTS interface subsystem (BIS) includes a plurality of assembly symbol subsystems (ASSs) for receiving the ATM cells transmitted from the base transceiver station (BTS) and performing a type conversion of the ATM cells to output a type converted ATM cells to the asynchronous transfer mode (ATM) switch, wherein the ASS includes:
    a processor for controlling an operation;
    a reception (RX) multiplexer for classifying the ATM cells into first ATM cells corresponding to internal signals to the processor and second ATM cells corresponding to remaining ATM cells, wherein the first ATM cells are transmitted to the processor;
    a reception (RX) type conversion unit for receiving the second ATM cells and classifying the second ATM cells into ATM adaptation layer 5 (AAL5) ATM cells and ATM adaptation layer 2 (AAL2) ATM cells, wherein the AAL5 ATM cells are bypassed to the reception (RX) multiplexer and the AAL2 ATM cells are converted into AAL2 prime ATM cells to transmit the AAL2 prime ATM cells to the reception (RX) type multiplexer;
    a transmission (TX) multiplexer for outputting the first ATM cells and the second ATM cells, the first ATM cells being transmitted to the processor; and
    a transmission (TX) type conversion unit for classifying the second ATM cells transmitted from the transmission (TX) multiplexer into AAL5 ATM cells and AAL2 ATM cells, wherein the AAL5 ATM cells are bypassed to the transmission (TX) multiplexer, and the AAL2 ATM cells are converted into AAL2 prime ATM cells to transmit the AAL2 prime ATM cells to the reception (RX) multiplexer.

2. The system as recited in claim 1, wherein the ATM cells are transmitted from the base transceiver station (BTS) to the BTS interface subsystem (BIS) via E1 line.

3. The system as recited in claim 2, wherein each assembly symbol (ASS) further includes:
    a plurality of E1 interface units for restoring and encoding data transmitted via the E1 line to output E1 frame data;
    a plurality of ATM physical layer execution units for extracting ATM cells from the E1 frame data and performing an error correction operation to ATM cell header and a cell rate decoupling operation; and
    a physical layer execution unit for performing a physical layer function to the ATM cells at a predetermined speed, wherein the ATM cells are transmitted between the reception (RX) multiplexer and an optical transceiver for transmitting the data to the ATM switch.

4. The system as recited in claim 3, wherein the ATM physical execution units transmit data to the BTS.

5. The system as recited in claim 4, wherein the optical transceiver receives data from the ATM switch and transmits the received data to the physical layer execution unit.

6. The system as recited in claim 5, wherein the number of the E1 interface units is determined by a total number of E1 lines that is controlled by the ASS.

7. The system as recited in claim 6, wherein the E1 interface units include PM4313 chips, wherein the ATM physical layer execution units include PM7344 chips, and wherein the physical layer execution unit includes PM5346 chip, the PM4313 chip, the PM7344 chip and PM5346 chip being provided by PMC-Sierra.

8. The system as recited in claim 7, wherein the predetermined speed is of 155 Mbps.

* * * * *